(12) United States Patent
Matton et al.

(10) Patent No.: US 8,775,770 B2
(45) Date of Patent: Jul. 8, 2014

(54) KEEPING FILE SYSTEMS OR PARTITIONS PRIVATE IN A MEMORY DEVICE

(75) Inventors: Maxime Matton, Waterloo (CA); Jacek Nawrot, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 855 days.

(21) Appl. No.: 12/489,073

(22) Filed: Jun. 22, 2009

(65) Prior Publication Data

US 2010/0268878 A1    Oct. 21, 2010

Related U.S. Application Data

(60) Provisional application No. 61/169,495, filed on Apr. 15, 2009.

(51) Int. Cl.
*G06F 12/02* (2006.01)
(52) U.S. Cl.
USPC ............... 711/173; 711/115; 711/E12.002; 713/2
(58) Field of Classification Search
USPC .............. 711/173, 115, E12.002; 713/2
See application file for complete search history.

(56) References Cited

U.S. PATENT DOCUMENTS

| 6,928,542 B2 | 8/2005 | Wen et al. |
| 2003/0225960 A1 | 12/2003 | Guu et al. |
| 2006/0176595 A1* | 8/2006 | Nagata ............................ 360/22 |
| 2008/0313366 A1* | 12/2008 | Sagi ................................ 710/38 |
| 2009/0119497 A1* | 5/2009 | Beelitz et al. ..................... 713/2 |
| 2009/0172658 A1* | 7/2009 | Wood et al. ................... 717/174 |

FOREIGN PATENT DOCUMENTS

| CN | 1461999 A | 12/2003 |
| WO | 0072508 A1 | 11/2000 |
| WO | 2006069274 A2 | 6/2006 |
| WO | 2008015412 A1 | 2/2008 |

OTHER PUBLICATIONS

Extended Boot Record; From Wikipedia; XP-002548221; Mar. 1, 2009; 5 pgs.
European Search and Examination Report; EP Application No. 09165198.4; Oct. 10, 2009; 7 pgs.
Chinese Office Action; Application No. 201010164402.7; Sep. 22, 2011; 10 pages.
European Examination Report; Application No. 09165198.4; Aug. 19, 2011; 7 pages.
Matton, Maxime, et al.; U.S. Appl. No. 13/347,949, filed Jan. 11, 2012; Title: Keeping File Systems or Partitions in a Memory Device.
Office Action dated Apr. 23, 2012; U.S. Appl. No. 13/347,949, filed Jan. 11, 2012; 17 pages.
Final Office Action dated Aug. 24, 2012; U.S. Appl. No. 13/347,949, filed Jan. 11, 2012; 7 pages.
Canadian Office Action; Application No. 2,700,012; Aug. 7, 2012; 2 pages.

(Continued)

*Primary Examiner* — Yong Choe
(74) *Attorney, Agent, or Firm* — Conley Rose, P.C.; J. Robert Brown, Jr.

(57) ABSTRACT

Disclosed is a method and apparatus for allowing a user to select, from a plurality of partitions on a memory device, which partitions may be visible to hosts connecting to the memory device.

10 Claims, 6 Drawing Sheets

(56) References Cited

OTHER PUBLICATIONS

Chinese Office Action; Application No. 201010164402.7; Jun. 21, 2012; 10 pages.
Chinese Office Action; Application No. 2010101644027; Jan. 15, 2013; 12 pages.
Notice of Allowance dated Jun. 4, 2013; U.S. Appl. No. 13/347,949, filed Jan. 11, 2012; 21 pages.
Canadian Office Action; Application No. 2,700,012; Jan. 6, 2014; 3 pages.
European Extended Search Report; Application No. 13180300.9; Feb. 27, 2014; 7 pages.
Chinese Office Action; Application No. 201010164402.7; Sep. 29, 2013; 7 pages.

\* cited by examiner

US 8,775,770 B2

KEEPING FILE SYSTEMS OR PARTITIONS PRIVATE IN A MEMORY DEVICE

CROSS-REFERENCE TO RELATED APPLICATIONS

The present application claims priority to U.S. provisional patent application No. 61/169,495, filed Apr. 15, 2009, by Maxime Matton, et al, entitled "Keeping File Systems or Partitions Private in a Memory Device", which is incorporated by reference herein as if reproduced in its entirety.

BACKGROUND

This disclosure relates generally to the field of memory devices, and in particular to the ability to keep a file system or partition private when connecting a memory device (i.e., a "memory stick", a "thumb drive" or similar devices) to a host device.

An external memory device (a memory device) may be connected to a computing device using a wired or wireless connection. A typical wired connection is USB, and a typical wireless connection is Bluetooth. A computing device includes any type of computer that has a processor, microprocessor, or other logic that has the ability to read and write memory and execute instructions. This includes but is not limited to large computers, small PC-style computers and laptops, PDAs, cameras and other video devices, controllers for various uses, and smart cell phones. The computing device may be called the host device, or simply the host.

The host and the memory device communicate using protocol stacks, or their logical and functional equivalent, using executable code or software on each end. The lower level layers of the protocol stack include the hardware and controllers. Using USB as an example, the lower levels will include USB ports/connectors and may include a cable physically between the host and memory device, plus USB controllers and drivers at each end (on the host and memory device). Other types of connections, such as Bluetooth, would have the connections applicable to that connection type (e.g., for Bluetooth a wireless connection is established using, at the lowest layers, Bluetooth controllers and device drivers).

Further up the stack, there will be application programming interfaces (API), one of which will include an application dealing with the management and control of memory devices (mass storage devices). On the host side, there will be an application that requests information about the layout of the memory on the memory device. On the memory device side, there will be code running at the same protocol level that answers the host's request for information. Many memory devices use a logical memory layout that is consistent with the Microsoft® method of laying out memory. This may include a master boot record (MBR) found at the lowest readable memory locations. The MBR contains information on how the memory is configured, including information on up to four partitions. This information is supplied to the host, which uses it to access partitions, file systems, etc., on the memory device.

DETAILED DESCRIPTION

An apparatus and method for using either a private/local MBR and a public/export MBR is described. In the following description, for the purposes of explanation, numerous specific details are set forth in order to provide a thorough understanding of the disclosed material. It will be apparent, however, to one skilled in the art and having the benefit of the present disclosure that the ideas and embodiments described may be practised without adherence to just these specific descriptions.

The disclosure further encompasses computer-readable medium configured such that when executed by a processor (a.k.a. a micro-processor, or any other logic that can execute stored instructions), the processes described herein are carried out.

Figure 1:
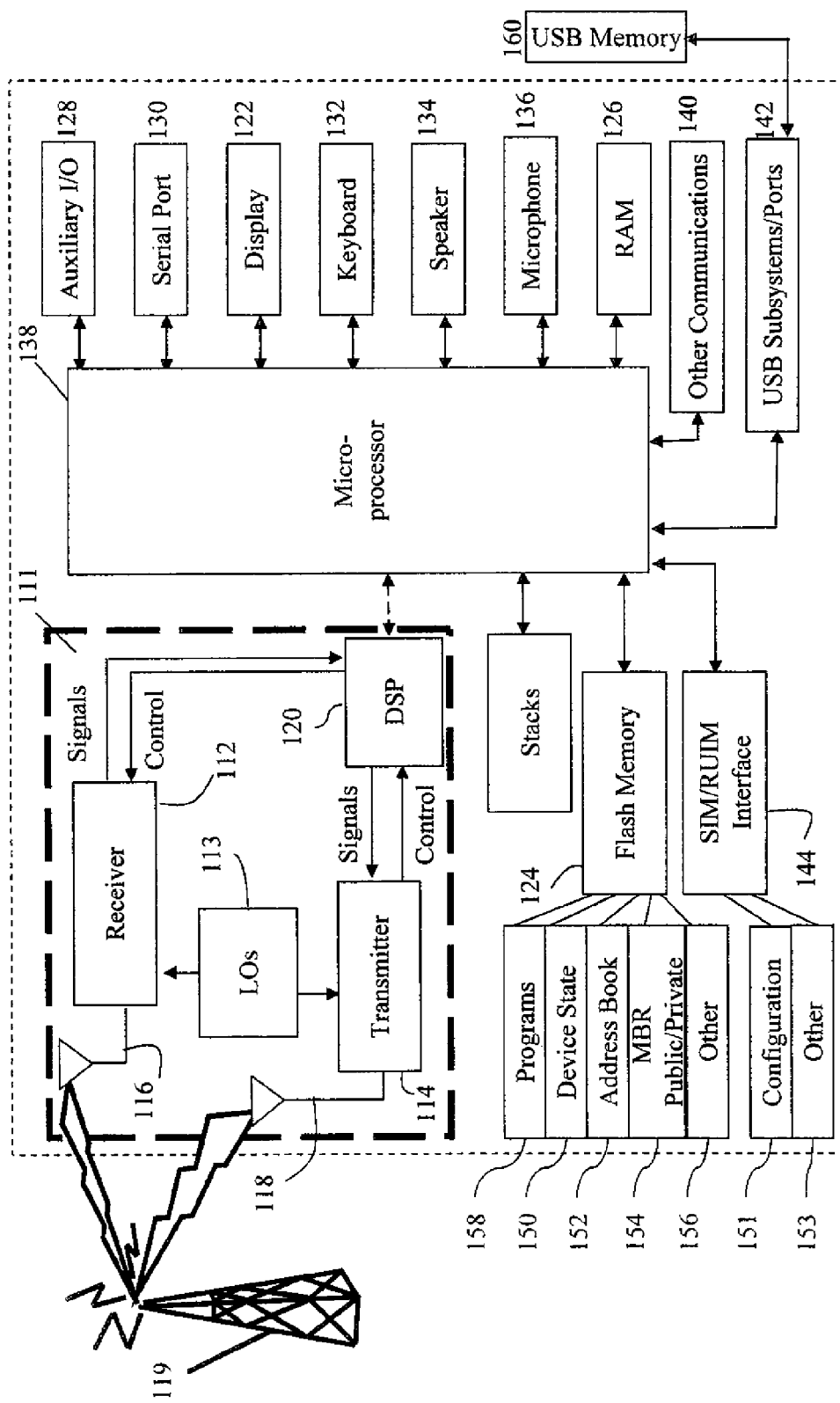
FIG. 1 is a block diagram of a host device and memory device.

Referring to the drawings, FIG. 1 is an exemplary host computing device, or simply host, with a memory device. Host 100 is a computing device having a processor, microprocessor, or other logic device which may execute instructions. Host 100 may have the capability to communicate with other computing devices, or computer systems, on the Internet. Depending on the exact functionality provided, the host may be referred to as a computer, a laptop, a net device, a data messaging device, a wired or wireless e-mail device, a smart cellular telephone, an Internet appliance, a control device or controller, a game console, or a data communication device, as examples.

Host 100 may have a wireless communication subsystem 111, outlined in a bolded border. This subsystem would exist in a host that has wireless telecommunications capabilities, such as a smart cell phone. In that case, host 100 would be enabled to communicate with wireless network 119 (without wireless telecommunications capabilities, wireless network 119 is not applicable). Components would include both a receiver 112 and a transmitter 114, as well as associated components such as one or more antenna elements 116 and 118, local oscillators (LOs) 113, and a processing module such as a digital signal processor (DSP) 120. As will be apparent to those skilled in the field of communications, the particular design of the communication subsystem 111, if present, may be dependent upon the communication network in which the device is intended to operate and the current state-of-the-art. For example, host 100 may include a communication subsystem 111 designed to operate within the Mobitex™ mobile communication system, the DataTAC™ mobile communication system, GPRS network, UMTS network, EDGE network, or any other suitable telecommunications network.

Illustrated for completeness, but only required for hosts with certain telecommunications capabilities, is SIM/RUIM module 144. In UMTS and GPRS telecommunications networks, network access is associated with a subscriber or user of host 100, the subscriber/user information being stored on the SIM/RUIM module 144. Telecommunications configuration data 151 and other information 153 is illustrated as being part of SIM/RUIM 144.

If host 100 has telecommunications capabilities, signals received by antenna 116 through the communication network are input to receiver 112, which may perform such common receiver functions as signal amplification, frequency down conversion, filtering, channel selection and the like, and in the example system shown, analogue to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analogue conversion, frequency up conversion, filtering, amplification and transmission over the communication network via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Host 100 typically includes a microprocessor 138 (processor, or other logic that may execute instructions) which controls the overall operation of the host by executing code, or software, stored in an executable sequence in memory retrievable by the microprocessor. Microprocessor 138 interacts with host subsystems such as the display 122, flash memory 124, random access memory (RAM) 126 and/or any other memory type (not shown), auxiliary input/output (I/O) subsystems 128, serial port 130, keyboard 132, speaker 134, microphone 136, a short-range communications subsystem 140 such as Bluetooth, and a USB subsystem 142. Specifically included are aspects of the user interface (UI), which typically includes the aforementioned keyboard but is not limited to a keyboard. The keyboard may be physical or virtual, or the UI can be configured as a series of choices where input at the keyboard determines which of the choices will be executed (implemented) by the host when the host runs an application which makes use of selections determined at the UI. An application is any combination of software or code executable by the microprocessor and stored in memory accessible by the microprocessor that when executed enables the functionality described.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element that can keep state through power cycling (not shown). Those skilled in the art will appreciate that the operating system, as well as logically defined applications such as games, address books, or parts thereof, are code or software which may be temporarily loaded into a volatile memory such as RAM 126 from NVRAM or ROM or any other involatile memory. Received communication signals may also be stored in RAM 126.

As shown, flash memory 124 can be segregated into different areas for both computer programs 158 and program data storage 150, 152, 154 and 156. Application MBR Public/Private 154 is described in more detail below. These different storage types indicate that each program can allocate a portion of flash memory 124 for their own data storage requirements. Microprocessor 138, in addition to its operating system functions, enables execution of software applications on the host. A predetermined set of applications that control basic operations will normally be installed on host 100 during manufacturing. One example of a typical software application may be a personal information manager (PIM) application having the ability to organize and manage data items relating to the user of the host such as, but not limited to, calendar events, appointments, and task items. Naturally, one or more memory stores would be available on the host to facilitate storage of PIM data items. Such a PIM application may have the ability to send and receive data items via a network and may further be configured to exchange data or information with other applications such as address book 152 or MBR Public/Private 154 if desirable.

Also shown is USB memory device 160. Any connection may be used, not just USB, including but not limited to Bluetooth, WiFi, or Firewire. For non-USB connections, other communications 140 would have the applicable software and hardware to make the connection. Memory device 160 has a microcontroller, data, instructions (code), and memory therein as needed to carry out the mass storage or memory storage functionality described herein. Included is a logical layout of the memory space (address space), including a master boot record (MBR). The MBR is described more fully below.

The memory 124 is a writeable store such as a RAM into which other device components and systems may write data, and includes a storage area for MBR Public/Private application 154, and an application data storage area 156. The MBR Public/Private application 154 stores MBR information and settings.

The data store 156 is illustrative of stores that may be implemented in the memory 124 on the host 100. The memory 126 may also be used by other device systems in addition to those shown in FIG. 1, and used to store described herein as well as other types of data.

Figure 2:
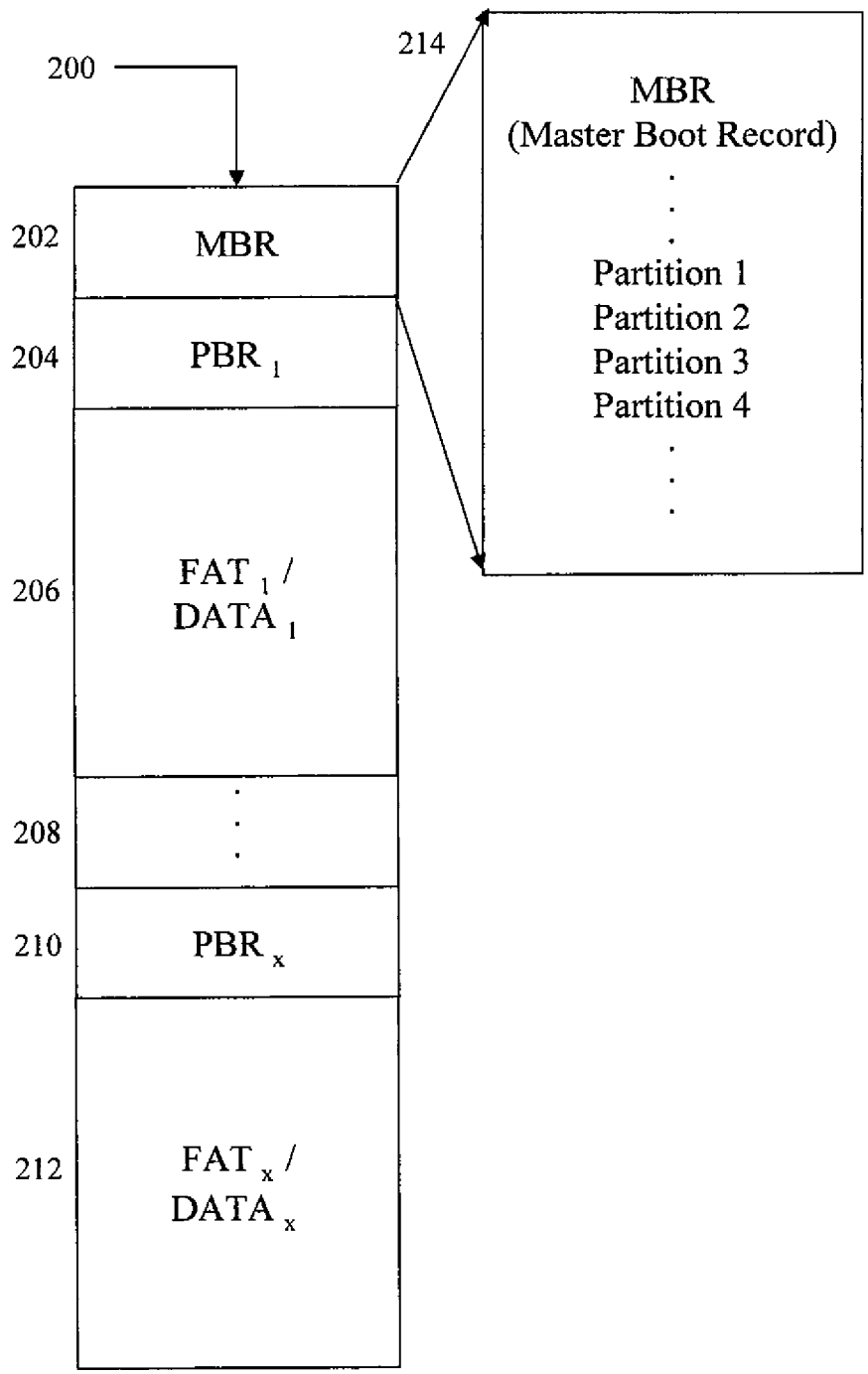
FIG. 2 is a block diagram of the layout of a memory device.

FIG. 2 shows a typical layout of memory used in memory devices. The memory device contains memory locations 200 logically divided as shown. In the lowest part of readable memory is the master boot record, or MBR. When the device is initializing itself or when the layout of the memory needs to be communicated outside of the device, the MBR is used. MBR 202 is shown in more detail at MBR 214. MBRs have various information needed to start the system or memory device, including a specially designated set of partition description fields. There are four sets of partition fields in an MBR, with the last partition field allowing a specially constructed extensible partition in case the memory has more than four partitions therein. If an extensible partition not required, partition 4 contains normal (non-extensible) partition information. For this disclosure, a partition is either "enabled" which means there are memory locations in the partition fields and the indicated memory has at least some file structure and/or data therein, reachable using the memory locations in the MBR, or is "empty" which means there is no addressing information in the MBR fields and the partition is therefore not in use.

The information in MBR 214 for each partition tells the software where each partition in memory is located. Partition 1 is located at the address where Partition Boot Record (PBR) starts, shown as PBR-subscript-1 204. PBRs contain information specific to just this partition, including the location of file access tables (FATs) and data. Generally, any partition following partition 1 is illustrated as PBR-subscript-x which contains the location of FATs, data, etc. for this particular partition. Unallocated or intervening memory locations, perhaps containing other partitions between partition 1 and partition x, are shown as memory area 208.

This is one example of memory layout. Variations are fully contemplated herein, including the use of various types and kinds of file access tables, no use of PBRs (file access tables only in partitions), or any other layout in a partition that enables use of the memory in the partition for its intended purpose.

Figure 3:
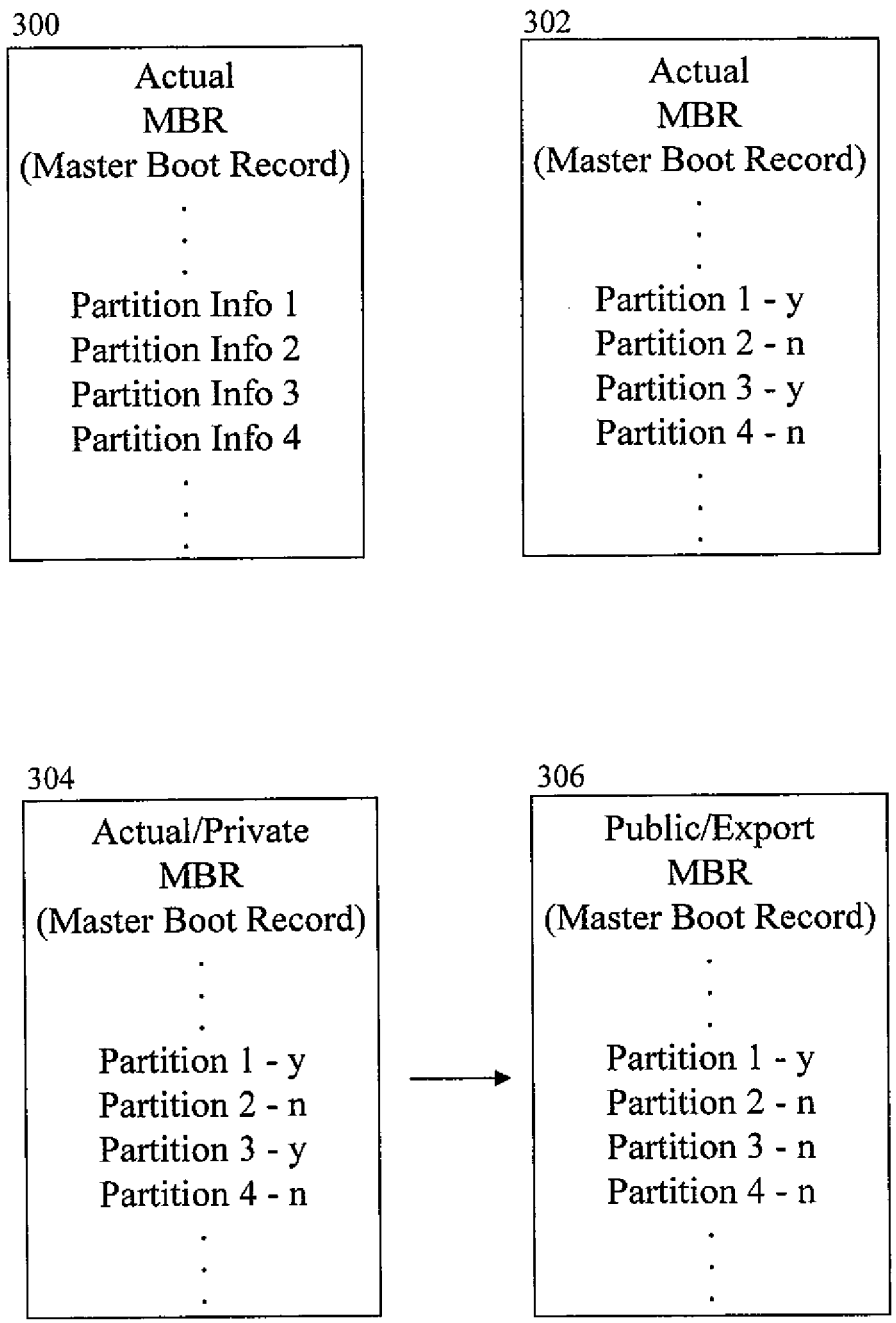
FIG. 3 is a block diagram illustrating MBR embodiments.

FIG. 3 illustrates examples of actual MBRs and introduces Public, or Export, MBRs. MBR 300 is an example MBR showing the availability of specially designated fields to describe up to four partitions. MBR 302 shows a case where two partition fields contain partition information, indicated by "y" for "yes", which means there is partition data in these fields. The partitions not defined, and therefore not in use, are indicated with a "n". Notice that there is no requirement that the partitions in use be in order in the MBR. This may come about if, for example, an intervening partition is deleted between two partitions still being used. In MBR 302, partitions 1 and 3 are defined and in use, while partitions 2 and 4 are not being used.

MBR 304 is the same as MBR 302, except it is labeled as an Actual/Private (alternatively, may be labeled as "Local") MBR. This label indicates that this MBR reflects the actual layout of memory in the memory device. MBR 306 is derived from MBR 304. This is indicated by the arrow pointing from MBR 304 to MBR 306. MBR 306 may have a subset of the partitions defined in MBR 304. In this example, MBR 304 has partitions 1 and 3 defined. MBR 306 has a subset of the two defined partitions, namely, partition 1 as being defined. Partition 1 is the same for both MBR 304 and MBR 306. It has the same information available, the same file systems, etc. However, MBR 306 has its partition 3 fields set as not defined (not in use). There are no pointers to the beginning of partition 3 in MBR 306. Thus, MBR contains a subset of the actual partitions on the memory device.

MBR 306 is called a public, or export, MBR because it is intended for use by certain hosts to which this modified MBR may be made public or may be exported (sent). Notice that the public MBR 306, by containing only information on partition 1, has hidden partition 3 and the entirety of its contents from anyone receiving MBR 306, the public MBR. Any host receiving the public MBR will have no knowledge of partition 3 or its contents. Notice that actual MBR 304 contains all the access information for partition 3, so no data is actually lost. The host system, however, cannot access it. Put differently, partition 3 is actually present but is logically non-existent to any host that has access to MBR 306, and not MBR 304.

In order to generate and use a public MBR in association with an actual or local MBR, code, for convenience called an application, may exist to manage the MBRs and their retrieval. This is shown on the host side as application 154 in FIG. 1 and is also located on the memory device.

Figure 4:
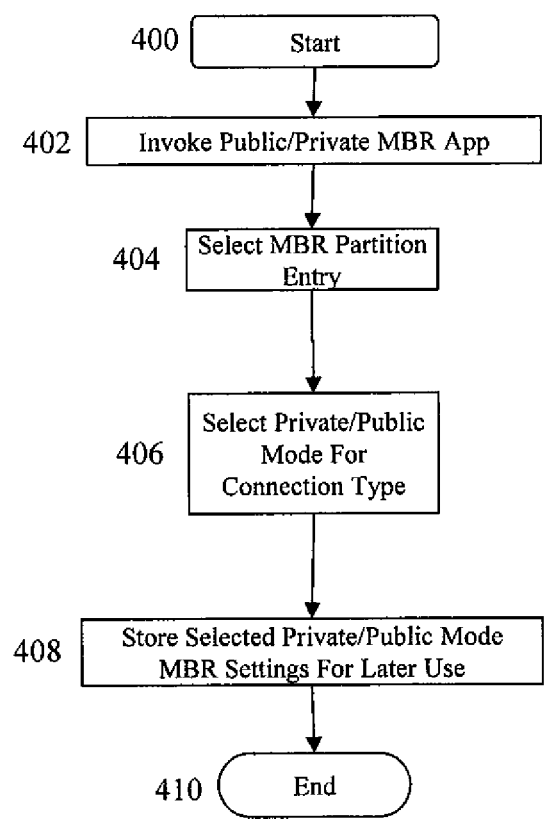
FIG. 4 is a flow chart illustrating the generation of an association between a public or export MBR and a private or local MBR.

FIG. 4 illustrates one of the functional properties of the MBR management application. The actions or state associated with entry location 400 are those such that the MBR management application is ready to be invoked. Continuing to box 402, the MBR application is invoked in a manner enabling selection, at the UI, of partitions to be made public (alternatively, to be kept private). At box 404, the user, at the UI (which may be a touch screen, a menu with scrolling ball selection, a keyboard input, etc.), indicates a partition for which a setting is to be made.

Continuing into box 406, the user indicates, through the UI, a setting to be made with the partition previously indicated. In some embodiments, this is expected to be a flag set to either "public" or "private". In other embodiments, other labels may be used such as "export" and "local". Continuing to box 408, the selection made by the user is stored in a manner that associates the selection with the actual MBR partition. This may be referred to as the public/private setting for the MBR partition. The setting indicates if this partition information is to be seen by any requester of the information, that is, is to be made public. Any restriction on who may see the partition information means the partition is not public. This information is stored locally, that is, on the memory stick itself using the code resident on the memory stick. It may or may not also be stored on a specially designated master host that is always allowed to see the private MBR. Once the setting is stored, box 408 is left for endpoint 410, indicating the application has finished for that one partition and may exit or may restart at 402 to allow the user to make any other changes.

In one embodiment, the code the enables the functionality described in FIG. 4 will be resident on a master host such as host 100 in FIG. 1. Once the settings are made, the code to use the settings would reside on the memory device or, in some embodiments, on the master host and the memory device. This allows designers to minimize the amount of code residing on the memory device. However, the actual configuration may be determined by each implementation, as meets the needs of that particular embodiment.

Functionally, the memory device minimally may need the code to make use of public and private MBRs. As further examples, some embodiments may store the MBRs on the memory device after they are generated on a specially designated host, and then use the MBRs when other hosts attach to the memory device. Other embodiments may execute code on the memory device that generates public MBRs as needed during each device initialization, for use in that connection session. These choices, and any other division of code, may be made by designers as desired for their embodiment of the presently disclosed material.

Figure 5:
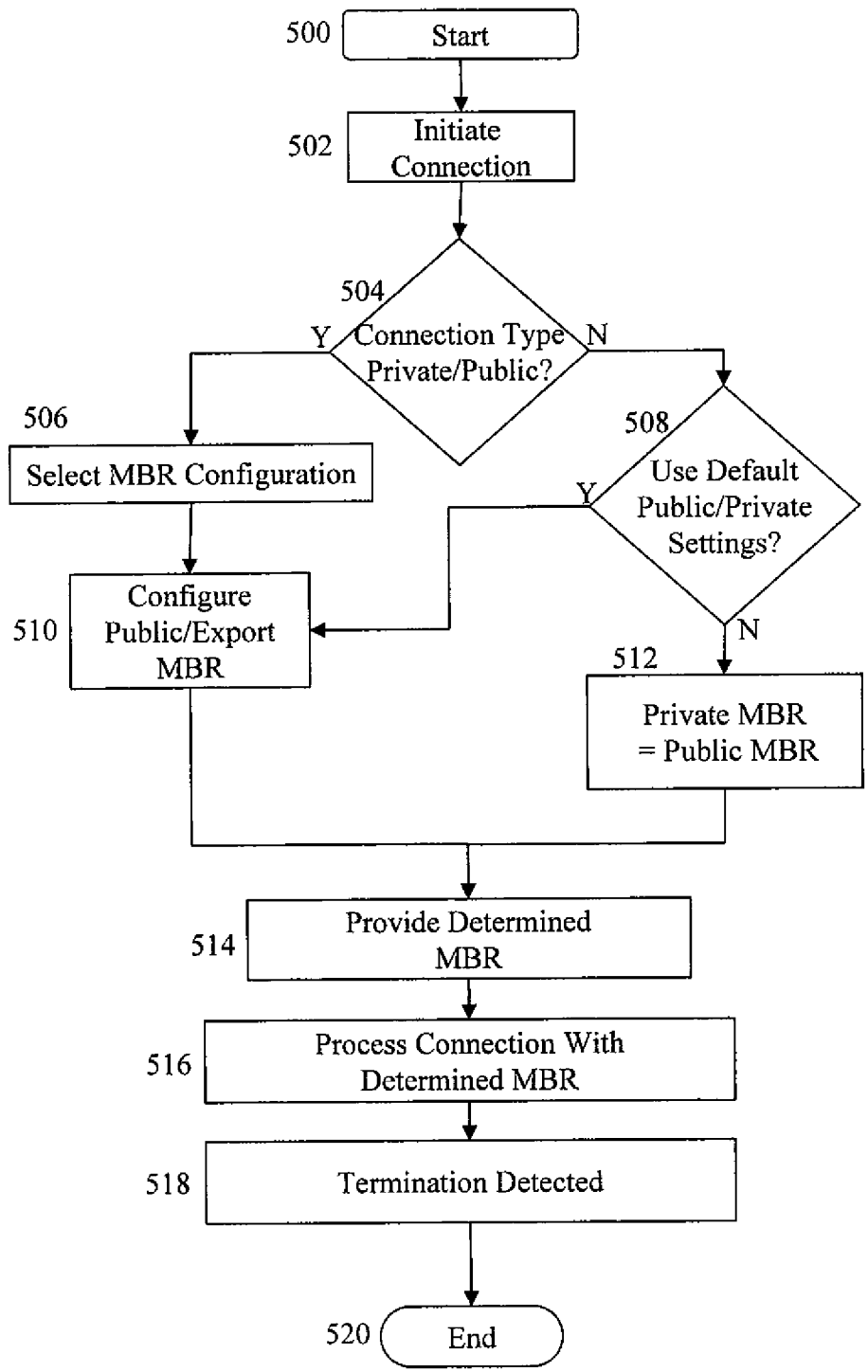
FIG. 5 is a flow chart illustrating the use of public or export MBRs and private or local MBRs.

FIG. 5 illustrates usage of public and private MBRs when a connection from a host to a memory device is made. Start indicator 500 represents a physical connection being made. Continuing to box 502, device connection continues with the actions needed to make a physical connection and, using the physical connection, complete a logical connection in order to make the memory device usable by the host. Box 502 is left for decision diamond 504. The decision to be made includes determining something about the type of the connection. In some embodiments, the type of connection may be used to determine how public and private MBRs will be used. One type of connection may be a Bluetooth connection, another is a USB connection, and another is a Firewire connection. In other embodiments, an indicator of the host identity may be used. This may include the host's MAC number or other hardwired numerical indicator, or the indicator may be a password or other soft indicator sent by the host during initialization.

If the answer is "yes", there is an MBR partition configuration associated with the connection type or host ID, and the "y" exit is taken to box 506. Note that in some embodiments, a host ID may be defined to include no host ID or an unauthenticated ID. The actions associated with box 506 include selecting the MBR configuration associated with the connection type of host ID.

Returning to decision diamond 504, if the answer is "no", there is no indication of any public or private partition settings for the incoming connection ID or connection type, and the "n" exit is taken to decision diamond 508. Decision diamond 508 corresponds to determining if there exists any default partition settings for connections without a previously specified connection or ID type. This may be used, for example, if a user wants to keep a partition private for anyone except her/him self. The default setting is then to keep the indicated partitions private. Note that in the case where a user wants to keep access only to themselves, a specially indicated host would have been recognized at decision diamond 504 to grant access, and this decision diamond would not be reached. If the answer at decision diamond 508 is "yes", there is a default to be used for unrecognized connections, and the "y" exit is taken to box 510. If the answer is "no", there is no general default, and the "n" exit is taken to box 512. The actions associated with box 512 are to determine that the public and private MBR are the same.

Returning to box 510, which is reached from either box 506 or decision diamond 508, the actions taken are to either make use of, or configure and make use of, a public MBR. In some embodiments, the actions may correspond to selecting one of an already generated set of MBRs consistent with the connection type or host ID. In other embodiments, code will execute to generate a public MBR based on the private MBR for this connection session. A connection session is a connection between a particular host and a particular memory device, from initial logical connection to the ending or breaking of the logical connection. The physical connection may or may not be terminated at the same time. In any event, without the logical connection, no information or communication is occurring between the host and the memory device. Thus, the connection may be ended through logically disconnecting the memory device, such as turning off the host, physically removing the memory device, or any other way of ending a connection to a host.

Continuing to box 514, the actions are those associated with the memory device using the MBR as determined. This may mean providing the determined MBR to the host. Continuing to box 516, the memory device continues to use the previously determined MBR for the remainder of this session. Finally, box 518 is entered when a session termination is detected. Actions associated with box 518 will be those consistent with the particular embodiment. In some embodiments, the MBR generated for this session is either actively erased (deleted) or is simply stored in a memory location which is to be overwritten upon device initialization. In other embodiments, the MBR is indicated as no longer for the current session. It may be used in a future connection session. Box 518 is left for end-point 520, which indicates the memory device is ready for a next connection session.

Note that the memory device may need to control MBR changes initiated by the host device. In some embodiments, the memory device may simply disallow MBR changes from host devices, excepting when the public and private MBR are the same. In other embodiments, the memory device may only accept MBR changes from a specially designated host device, such as a master host device.

Figure 6:
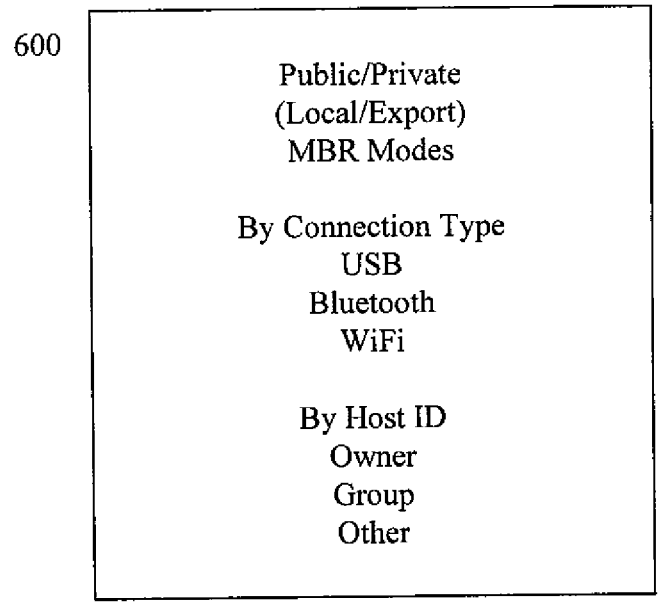
FIG. 6 is a table of MBR modes.

FIG. 6 is a table indicating some of the connection types or host ID types that may be used to determine MBR usage. The memory device may decide on public/private MBR usage based on physical connection type, such as any USB connection uses settings "USB", any Bluetooth connection uses settings "BT", or any other connection type using its designated connection indicator. Alternatively, host ID may be used to determine partition accessibility (MBR public or private). A host ID may be used to identify a particular host with certain settings, a group of hosts with a different setting, and any other host not in the above groups with a default setting. Further, there may be a hierarchical relationship between the types. For example, the memory device may check for a host ID of either "Owner" (can set the MBR settings), "group" (access to partitions but cannot change any public/private settings), followed by connection type (all USB connections get MBR with partition 2 but not 3), and finally a general default setting (the only visible partition is partition 1).

The above descriptions are to illustrative examples of the new and unobvious ideas contained herein. To people having the benefit of this disclosure and who have knowledge in this field, variations will be apparent while staying within the scope of the concepts described and claimed, whether or not expressly described.

What is claimed is:

1. A method of using a master boot record (MBR) on a memory device for partition visibility during a connection session to a host, the memory device configurable for use with a host, the method comprising:
   detecting a connection initiation;
   determining, by the memory device, a host identity (ID);
   retrieving a partition setting associated with the host ID, the partition setting having been previously associated with the host ID to allow determination of visibility of a partition using an MBR;
   determining an MBR based on the retrieved partition setting; and
   using the determined MBR during the connection to the host.

2. The method of claim 1 where the determining a host ID further comprises receiving a password during device initialization.

3. The method of claim 1 where the determining a host ID further comprises detection of a hardware-based indicator.

4. The method of claim 1 where the determining an MBR comprises generating an MBR for the session.

5. The method of claim 1 where the determining an MBR comprises selecting an existing MBR for the session.

6. A method of using a master boot record (MBR) on a memory device for partition visibility during a connection session to a host, the memory device configurable for use with a host, the method comprising:
   detecting a connection initiation;
   determining, by the memory device, a connection type;
   retrieving a partition setting associated with the connection type, the partition setting having been previously associated with the connection type to allow determination of visibility of a partition using an MBR;
   determining an MBR based on the retrieved partition setting; and
   using the determined MBR during the connection session.

7. The method of claim 6 where the determining a connection type further comprises detecting a wireless or wired connection type.

8. The method of claim 6 where the determining a connection type further comprises detecting a Universal Serial Bus (USB) connection.

9. The method of claim 8 where the determining an MBR comprises generating an MBR for the session, based on the partition settings for the connection type.

10. The method of claim 8 where the determining an MBR comprises selecting an existing MBR for the session based on the partition settings for the connection type.

* * * * *